US005876554A

United States Patent [19]

Lafond

[11] Patent Number: 5,876,554

[45] Date of Patent: Mar. 2, 1999

[54] APPARATUS FOR SEALING THE CORNERS OF INSULATED GLASS ASSEMBLIES

[76] Inventor: Luc Lafond, 23 Woodvalley Drive, Etobicoke, Ontario, Canada, M9A 4H4

[21] Appl. No.: 872,998

[22] Filed: Jun. 11, 1997

[51] Int. Cl.[6] .................... C03C 27/10

[52] U.S. Cl. .................... 156/500; 156/107; 156/109; 156/244.22; 156/578

[58] Field of Search .................... 156/500, 578, 156/107, 109, 244.22; 118/100, 101, 120

[56] References Cited

U.S. PATENT DOCUMENTS

| | | | |
|---|---|---|---|
| 3,947,311 | 3/1976 | Jarchow et al. | 156/357 |
| 4,088,522 | 5/1978 | Mercier et al. | 156/107 |
| 4,110,148 | 8/1978 | Rocholl | 156/359 |
| 4,145,237 | 3/1979 | Mercier | 156/107 |
| 4,205,104 | 5/1980 | Chenel | 428/34 |
| 4,234,372 | 11/1980 | Bernhard et al. | 156/356 |
| 4,561,929 | 12/1985 | Lenhardt | 156/522 |
| 4,711,692 | 12/1987 | Lisec | 156/109 |
| 4,743,336 | 5/1988 | White | 156/522 |
| 4,759,810 | 7/1988 | Jackson et al. | 156/64 |
| 4,780,164 | 10/1988 | Rueckheim et al. | 156/104 |
| 4,826,547 | 5/1989 | Lenhardt | 156/109 |
| 5,650,029 | 7/1997 | Lafond | 156/107 |
| 5,762,738 | 6/1998 | Lafond | 156/107 |

*Primary Examiner*—Geoffrey L. Knable
*Attorney, Agent, or Firm*—McFadden, Fincham

[57] ABSTRACT

The present invention relates to an apparatus and method for injecting sealant material into the corners of an insulated glass assembly suitable for use in manual and automated production. It has been found that significant saving in both time and material can be achieved by only sealing the corners of the assembly, particularly using the automated method and apparatus. The apparatus includes a pair of wiper blocks each having a surface for abutting an edge of a glass assembly arranged in substantially perpendicular configuration to each other, adapted for converging and diverging reciprocal movement from an adjoining position for molding a square corner to a separated position for wiping smooth the surface for the injected sealant material. A nozzle is positioned between the wiper blocks for injecting sealant material into the corner area and retracting in concert with the converging movement of the wiper blocks. The method according to the present invention includes confining a corner area to be filled with sealant material, injecting sealant material into the corner area, molding the injected sealant into a substantially square corner, and wiping smooth the surface of the injected sealant.

16 Claims, 5 Drawing Sheets

APPARATUS FOR SEALING THE CORNERS OF INSULATED GLASS ASSEMBLIES

FIELD OF THE INVENTION

The present invention relates to an apparatus and method for sealing the corners of insulated glass assemblies, in particular the invention relates to an apparatus and method suitable for use in manual and automated production.

BACKGROUND OF THE INVENTION

Insulated windows comprise an assembly of multiple substrates (generally glass) in a spaced apart configuration with air or other insulating gas sealed in the void between the substrates. If the seal is broken, moisture can enter the assembly which condenses on the glass and clouds the window and also reduces its insulating properties.

A spacer around the periphery of the substrates maintains the substrates in the spaced apart configuration. Commonly a sealant material is applied around the perimeter of the assembly in the channel between the edges of the substrates and the spacer material to prevent the seal from breaking due to separation of the substrate from the spacer and to prevent penetration of moisture through the spacer. Examples of devices for sealing an assembly perimeter are shown in U.S. Pat. No. 4,826,547 issued to Lenhardt, and in a previous application to the present inventor under U.S. Ser. No. 08/694,666.

Some spacers, particularly those including polybutylene, or other butyl materials, or combinations of multiple sealant materials, particularly including polymeric materials such as polysilicones, EDPM, and polyurethanes, have been found to have excellent sealing properties in contact with the inner surfaces of the substrates without an additional layer of sealant material.

At the corners, however, the insulation, sealing and moisture barrier properties may be reduced. Ends of the spacer are generally joined at the corners. In other cases the spacer is bent or folded to form a corner. It is preferred to cut or notch the spacer partially to form a square folded corner without bulging or wrinkling. At the cut, notch, or join additional sealant is preferably applied to maintain the integrity of the seal. For the greatest efficiently the sealant material must join with the spacer to form an airtight seal with the glass surfaces and the spacer material. Thermoplastic materials such as butyl materials are commonly used. In a preferred assembly the spacer and sealant are selected to be compatible to form a chemical bond between them. Since the entire perimeter of the glass assembly will not be filled with sealant material, the spacer can advantageously be placed close to the edges of the assembly reducing excess glass costs. The shallow channel between the spacer and the edge is used to spread sealant material in a smooth layer from the corner area. Significant savings in both time and material can be achieved if only the corners are to be sealed, particularly using an automated method and apparatus.

SUMMARY OF THE INVENTION

Accordingly the present invention provides an apparatus for injecting sealant material into a corner of a glass assembly including at least two substrates having corners aligned in spaced apart configuration by a spacer joining the peripheries of the substrates comprising:

support means for supporting the glass assembly in the apparatus; positioning means for locating the corner of a glass assembly in the apparatus;

securing means for maintaining the glass assembly in position in the apparatus;

a cooperating pair of wiper blocks each having a surface for abutting an edge of the glass assembly arranged in angular configuration to each other, adapted for converging and diverging reciprocal movement from a first adjoining position for molding the injected sealant material into an angled corner, to a second separated position for wiping smooth the surface of the injected sealant material; and nozzle means for injecting sealant material into a corner of a glass assembly arranged between the wiper blocks and adapted to retract from the corner of the glass assembly in concert with the converging movement of the wiper blocks.

In an alternate embodiment the present invention comprises an automated sealant injection station for sealing the corners of a glass assembly comprising:

conveyor means for advancing a glass assembly into and out of the injection station;

at least one injection head, comprising:

positioning means for locating the corner of a glass assembly in the apparatus;

securing means for maintaining the glass assembly in position in the apparatus;

a cooperating pair of wiper blocks each having a surface for abutting an edge of the glass assembly arranged in angular configuration to each other, adapted for converging and diverging reciprocal movement from a first adjoining position for molding the injected sealant material into a substantially square corner, to a second separated position for wiping smooth the surface of the injected sealant material; and nozzle means for injecting sealant material into a corner of a glass assembly arranged between the wiper blocks and adapted to retract from the corner of the glass assembly in concert with the converging movement of the wiper blocks, wherein each injection head is adapted to receive a corner of an assembly for sealing, and to retract to allow the assembly to pass through the station once the sealing operation is complete.

In a preferred embodiment, the invention further provides an automated sealant injection station for sealing the corners of a glass assembly as described above including two cooperating injection heads each injection head including means for rotatable positioning from a first position for receiving two leading corners of the assembly to a second position for receiving two trailing corners of the assembly.

A method according to the present invention of sealing the corners of a glass assembly including at least two substrates having corners aligned in spaced apart configuration by a spacer joining the peripheries of the substrates comprising the steps of:

positioning a corner of the glass assembly for sealing;

confining a corner area of the glass assembly between the spacer and the corner of the glass assembly to be filled with sealant material;

injecting sealant material into the corner area;

closing the corner of the assembly including the injected sealant material and molding the injected sealant material into an angled corner; and wiping surfaces of the injected sealant smooth.

It is advantageous to apply sealant according to a method which enables the sealant to be chemically bonded to the polymeric material of the spacer and to provide an apparatus which applies a chemically bonded seal. It is particularly advantageous to heat the surfaces of the spacer and glass assembly in the corner area to which the sealant must bond.

The invention will be more clearly understood as described with reference to the following Figures, which illustrate a preferred embodiment of the present invention, in which:

BRIEF DESCRIPTION OF THE DRAWINGS

Like numerals are used throughout to designate like elements.

DETAILED DESCRIPTION OF THE DRAWINGS

Figure 3A:
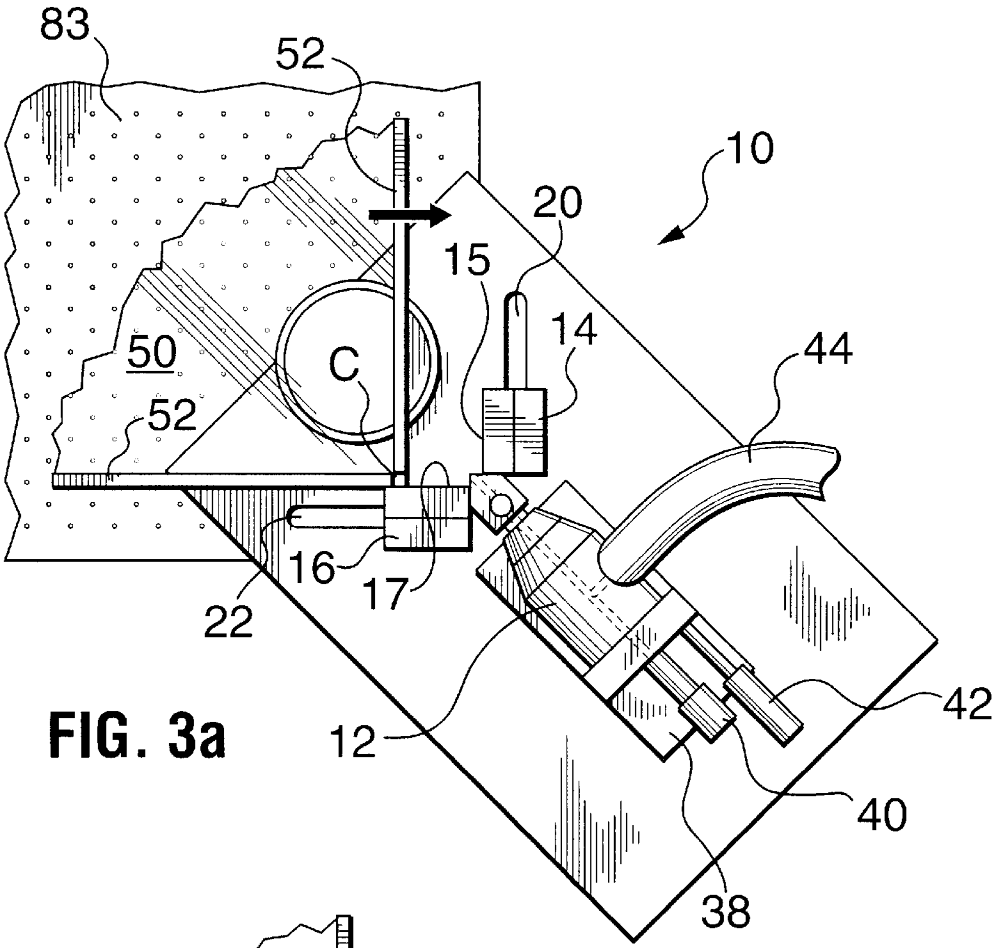
FIGS. 3*a–d* illustrate the operation sequence of the injection head in detail.
Figure 3B:
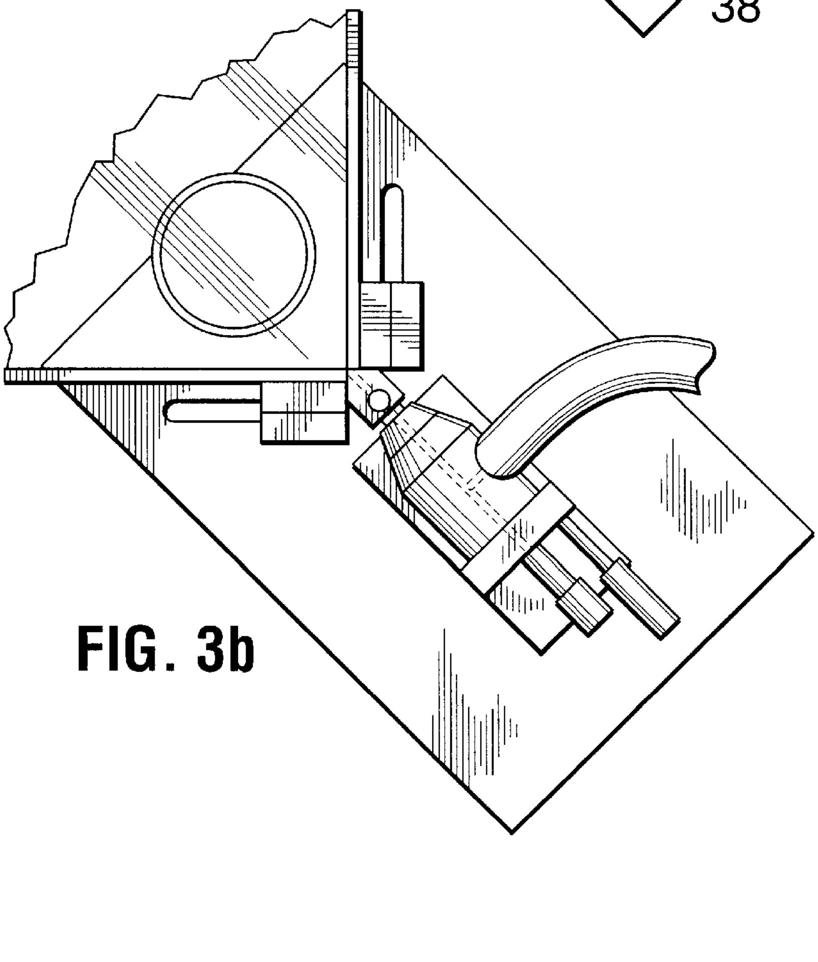
Figure 3C:
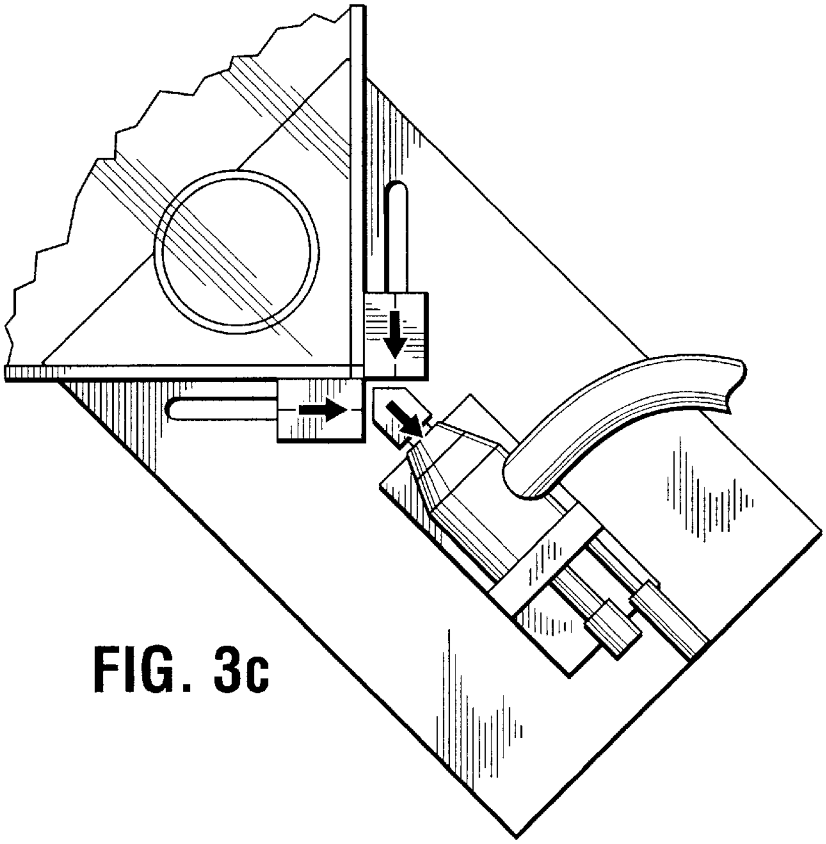
Figure 3D:
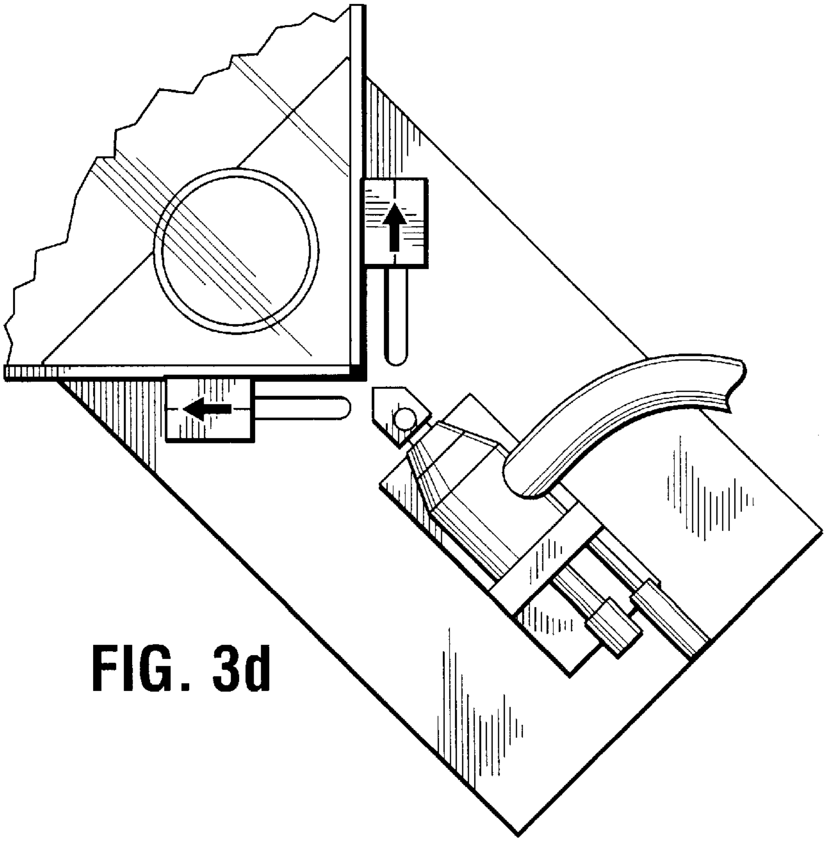
Figure 3E:
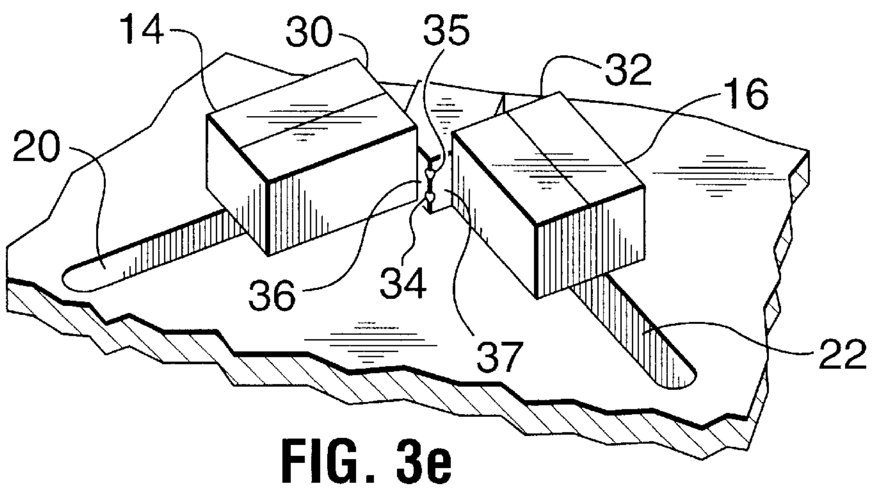
FIG. 3*e* shows the nozzle and block assembly of the injection head from a reverse angle, in greater detail.
Figure 4A:
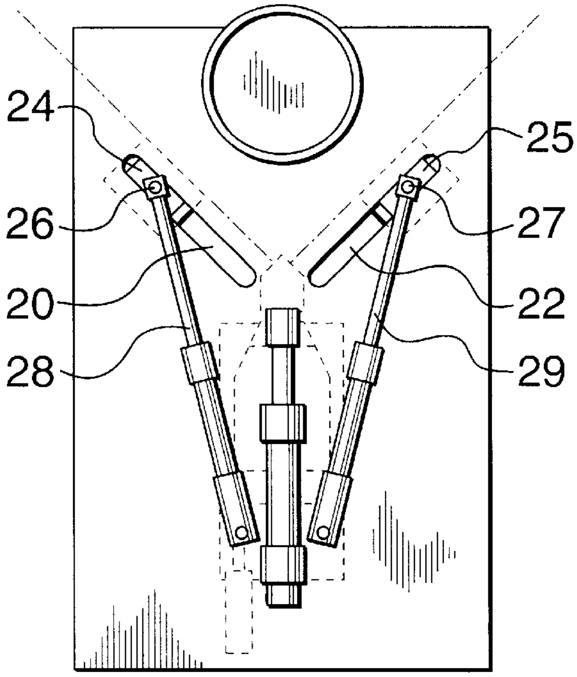
FIGS. 4*a–b* show the mechanical linkages operating the injection head of FIG. 3 in fully extended and fully retracted positions.
Figure 4B:
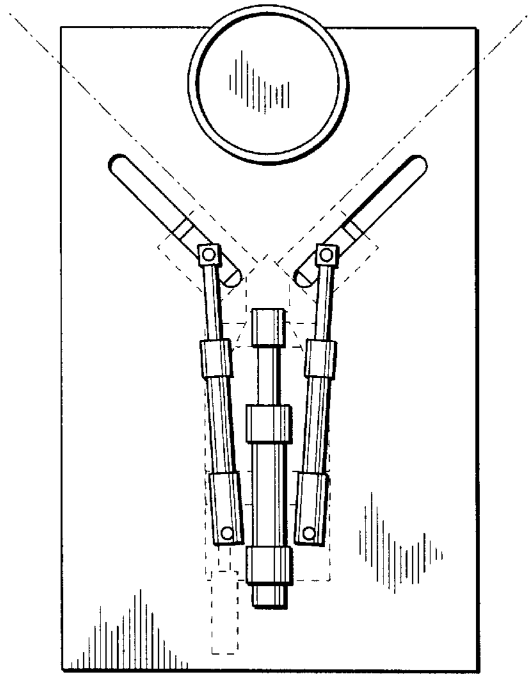

The injection head shown in detail in FIGS. 3 and 4 is designated generally at 10. The head includes a retractable nozzle 12 and a pair of wiper blocks 14, 16 arranged in a planar configuration aligned with the glass assembly 50 to be sealed. The injection head 10 is supported on an appropriate conventional glass handling structure, namely a caster or float table in a manual assembly line or with automated conveyors in an automated line. Associated with the injection head 10 is a suction cup or other equivalent means for securing the glass assembly 50 during the sealing operation.

The wiper blocks 14, 16 are arranged in a perpendicular configuration for receiving the corner of a glass assembly 50. The interior surface 15, 17 of each wiper 14, 16 serves as a guide to position the glass assembly 50. The interior surfaces 15, 17 which contact the sealant material are faced with TEFLON™, other non-stick material and are preferably heated to form a smooth surface on the sealant material. If the spacer 52 is spaced inwardly from the edge of the assembly 50, leaving a deeper channel to be filled with sealant, the blocks are provided with a profile to fit into the channel to confine the corner area while sealant is injected.

The blocks 14, 16 are adapted to move reciprocally in slots 20, 22 or similar guides. Movement is coordinated to move simultaneously in converging or diverging directions. As shown the blocks 14, 16 are positioned above slots 20, 22. A shoe 24, 25 attached to the block 14, 16 limits movement to a linear path. As seen in FIG. 4, the shoe 24, 25 is pivotally attached by a pin or ball joint 26, 27 to a pneumatic cylinder 28, 29 which actuates the reciprocal movement. At the converged position (shown in FIG. 3*c*) the blocks 14, 16 meet edge 30 to edge 32 to completely close the corner C of the glass assembly 50 for molding a square corner of the applied sealant.

Hot melted butyl, a common sealant, is very tacky, and prone to forming strings and hairs as one surface is separated from another. In order to prevent this problem, the edges 30, 32 of the blocks 14, 16 which meet also serve to wipe the nozzle 12 as they converge and the nozzle 12 is withdrawn, as seen in FIG. 3*c*. This motion draws any excess sealant material into the corner area where it is smoothed into the shallow channel between the substrates and the spacer.

The nozzle 12 is shaped to fit into the corner of the glass assembly 50, and has an orifice 34 at the tip for injecting sealant into the corner area. Internally a conventional needle valve is provided to open and close the orifice 34 and to adjustably regulate the flow of sealant. A timing sequence or other means known to those skilled in the art is used to control the volume of sealant injected. Adjacent the orifice 34 the nozzle 12 has side surfaces 36, 37 adjacent the path of the edges 30, 32 of the wiper blocks 14, 16. The nozzle side surfaces 36, 37 and the block edges 30, 32 (seen in detail in FIG. 3*e*) cooperate to wipe excess sealant from the nozzle 12 into the molded corner or smoothed into the shallow channels in the edges of the glass assembly. The nozzle 12 is supported on a slider 38 which is connected to a pneumatic cylinder 40 to actuate reciprocal movement. A hydraulic check cylinder 42 is also secured to the slider 38 to control the rate of nozzle movement.

For use with a thermoplastic sealant material, such as hot melted butyl, all elements of the nozzle 12 and feed 44 through which the sealant passes are heated to allow the sealant to flow. The heated nozzle 12 advantageously can be used to heat the glass surfaces and adjacent spacer material 52 by correction to improve the bond between sealant, spacer and the glass. An additional heat source 35, such as a hot air jet or light source for heating or curing bonding material, is advantageously associated with the nozzle 12 adjacent the orifice 34.

In operation a glass assembly 50 is advanced to the injection head 10 until it abuts a first wiper surface 17, and then transversely until it abuts the second wiper surface 15. Once the glass assembly 50 is in position, the suction cup 18 is activated to secure it in position. The wiper blocks 14,16 are originally positioned in an angular configuration adjoining the nozzle 12, which is in the forward position inside the corner of the assembly 50 in place to inject sealant, as shown in FIG. 3*a*. The nozzle 12 pauses heating the spacer material 52. In this configuration, the corner area C to be sealed is confined by the wiper blocks 14, 16. The nozzle 12 injects sealant material until the valve stops the flow. Simultaneously, the nozzle 12 retracts while the blocks 14, 16 converge to an adjoining position to mold a square corner, as shown in FIG. 3*c*. Aping any excess sealant is wiped from the side surfaces 36, 37 of the nozzle 12 into the corner. In this position sealant is molded by the wiper blocks 14, 16 into a substantially square corner. The wiper blocks 14, 16 then diverge simultaneously to the position shown in FIG. 3*d*, wiping and smoothing the sealant material into the shallow channel in the edges of the assembly 50. The injection is made under pressure to insure good fill and sealing contact with the glass assembly 50. Some excess sealant material is applied as a result. This excess is used to form a smooth join between the sealant and the edge of the glass assembly 50. The operation finished, the glass assembly 50 is released by the suction cup 18 and removed from the injection head 10, and the nozzle 12 then returns to the forward position ready for the next application. The sequence of operations is preferably regulated by a central controller.

The injection head 10 may be adapted to be used with a manual assembly operation on a caster or float table 83. The glass assembly 50 is positioned manually in the injection head 10. Once the operation is finished the glass assembly 50 is removed manually and rotated to seal the next corner.

Figure 1:
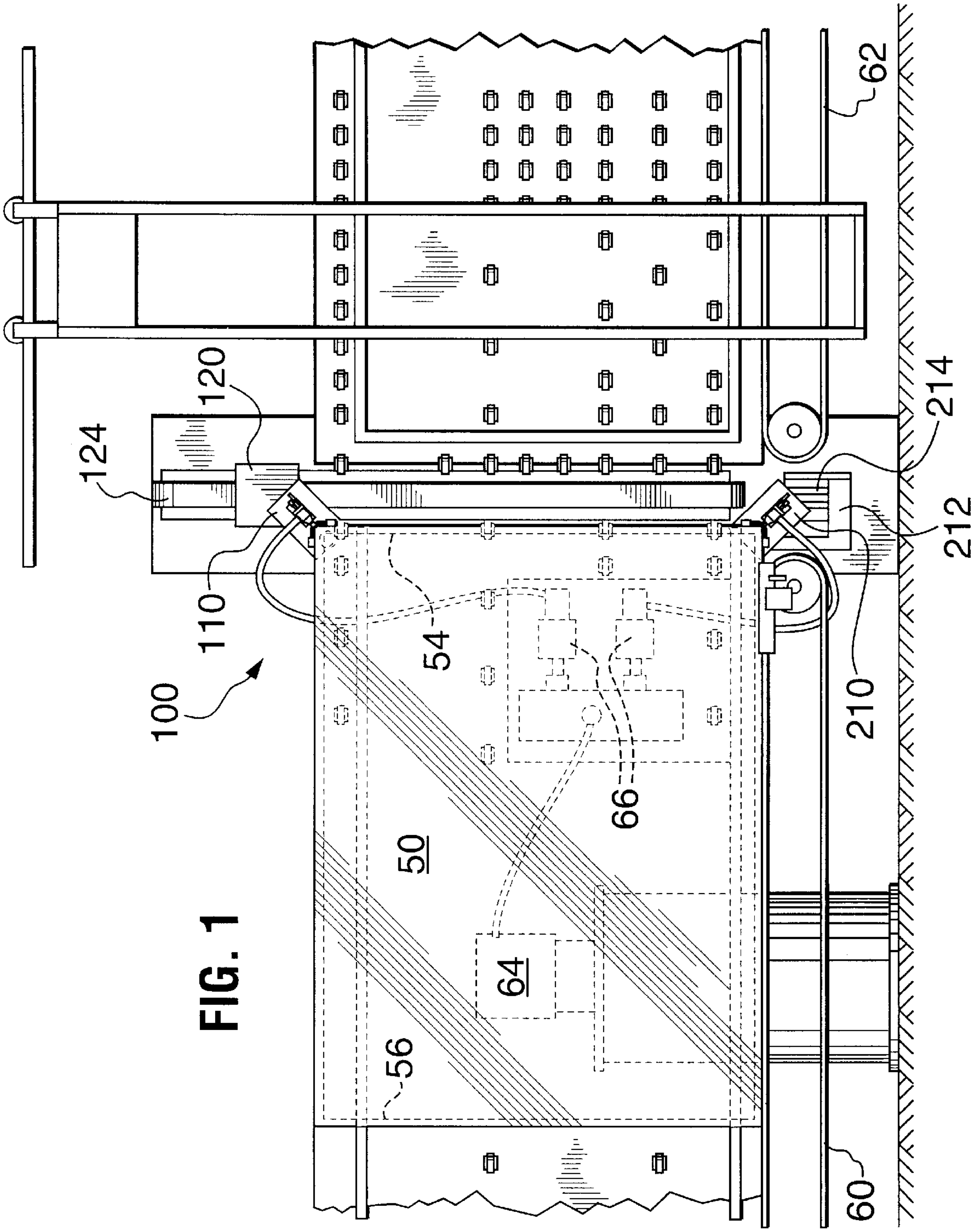
FIG. 1 illustrates an automated sealant injection station according to the present invention, suitable for an automated production line.
Figure 2A:
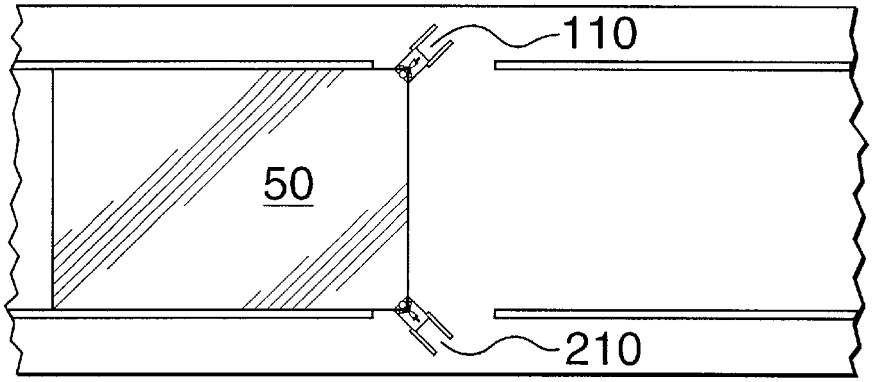
FIGS. 2*a–d* illustrate schematically a sequence of operations in the automated station of FIG. 1.
Figure 2B:
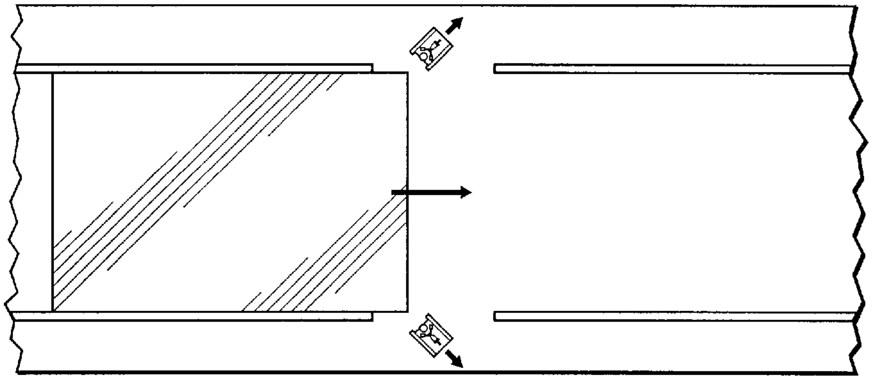
Figure 2C:
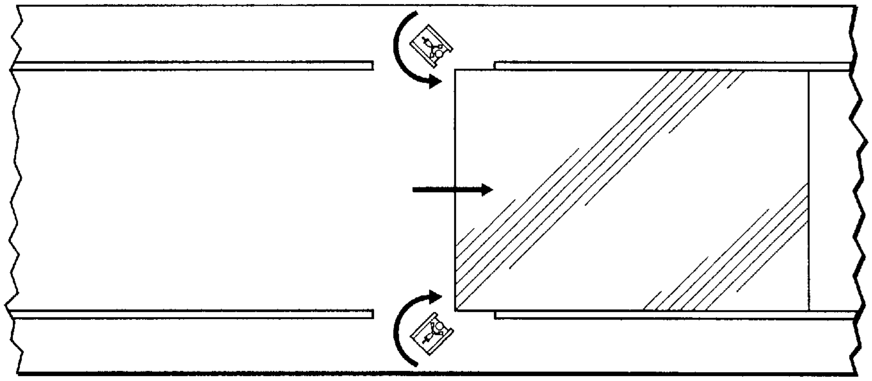
Figure 2D:
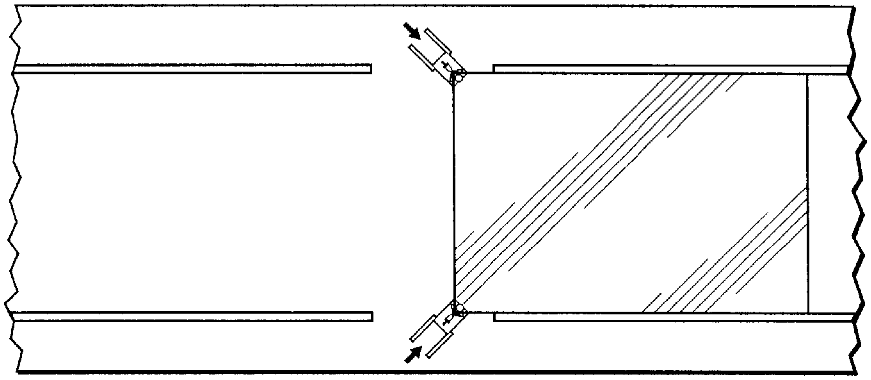

Alternatively, the injection head 10 may be rotatably mounted on a transverse beam (not shown) for transverse movement across a glass assembly 50 providing a degree of automated positioning. Such a configuration would permit two corners of a glass assembly 50 to be sealed sequentially before the glass is rotated for sealing the opposite corners As shown in FIG. 1, the invention is shown in an assembly for automated sealant application suitable for use in an automated assembly line. In a preferred embodiment the glass assembly 50 is transported in a vertical arrangement, however, the apparatus and its operation are substantially the same for a horizontally oriented device. A pair of conveyors 60, 62 are provided for advancing the glass assembly 50 to a sealing station 100 having an upper 110 and a lower 210 injection head. A feed source 64 supplies sealant material through metering pumps 66 to each injection head 110, 210.

The lower injection head 210 is supported on support arm 212 of the frame by pneumatic cylinders 214 for raising the injection head 210 into position, and lowering it to allow the glass assembly 50 to pass through the sealing station 100. The upper injection head 110 is mounted on a vertical traveller 120 driven by a servo motor on an endless belt 124 for adjustment to the height for different sizes of glass assemblies 50. The servo motor also raises the injection head 110 to allow the glass assembly 50 to pass through the sealing station 100. Both application heads 110, 210 are rotatably supported on pivots which can be actuated by pneumatic cylinders, indexing cylinders, or the like, for positioning in a first position at substantially 45° to the vertical leading edge 54 of the glass assembly 50, to a second position 90° from the first position at substantially 45° to the vertical trailing edge 56 of the glass assembly 50. These two positions allow each injection head 110, 210 to inject sealant into the corners of the leading edge 54 of the glass assembly 50, rotate and inject sealant into the corners of the trailing edge 56 of the glass assembly 50 once it is advanced into the injection station, as seen in FIGS. 2*a–d.*

In operation the automated station 100 receives a glass assembly 50 on the conveyor 60 and advances it to the position as shown in FIG. 1. The upper and lower injection heads 110, 210 are positioned to receive the leading corners of the glass assembly 50. As discussed above the glass assembly 50 abuts the surface 17 of the first wiper block 16 and advances until it is in position abutting the surface 15 of the second wiper block 14. A suction cup 18 or appropriate mechanism releasably secures the glass assembly 50 in position. The wiper blocks 14, 16 confine the corner area. The nozzle 12 heats the spacer material 52, and then injects sealant once the wiper blocks 14, 16 are in position. The nozzle 12 retracts as the wiper blocks 14, 16 converge to close and mold a square corner simultaneously wiping the side surfaces 36, 37 of the nozzle 12. The wiper blocks 14,16 diverge and wipe smooth the surface of the injected sealant.

The upper injection head 110 is raised out of the path of the glass assembly 50, and the lower injection head 210 is lowered by the pneumatic cylinders 214 out of the path of the glass assembly 50. The glass assembly 50 is released and advanced on the conveyors 60, 62. As the glass assembly 50 advances on the conveyors 60, 62 it trips a location sensor which stops the glass assembly 50 in position for sealing the trailing corners. The injection heads 110, 210 rotate 90° from the first position to the second position for sealing the corners of the trailing edge 56 of the glass assembly 50. The upper injection head 110 is lowered and the lower injection head 210 is raised into position with the wipers 14, 16 abutting the edges of each corner. The glass assembly 50 can be placed precisely by the conveyors, or the conveyors can reverse direction to place the trailing corners against the wiper blocks 14, 16 as for the leading corners. Alternatively, using advancing cylinders, or the like, with head assembly 110, 210, the heads can be finally positioned against the glass assembly 50.

The sequence begins again injecting sealant into the corners. The glass assembly 50 is released and transferred out of the sealing station, and the injection heads 110, 210 are rotated back into position to receive the next glass assembly. The sequence of operation is preferably regulated by a central controller. Location sensors can be used to trigger the operations synchronously with the progress of the glass assembly.

Advantageously two injection stations 100 each including two cooperating injection heads can be arranged sequentially in an automated assembly. A first injection station is provided to seal the leading corners of an assembly which is then advanced to a second station which seals the trailing corners. This permits two assemblies to be sealed simultaneously and eliminates the need to rotate and reposition the injection heads.

Alternatively, sealing of all four corners can occur simultaneously with four appropriately oriented injection heads. The injection heads are retractably mounted to permit the glass assembly to pass through the injection station once the sealing operation is complete. No provision is necessary to rotate the injection heads.

Irregular shaped glass assemblies, such as round, are equally suited to be filled and sealed according to the present invention. A bend, joint or notch in the spacer will generally present an angled space to be filled, sealed and molded as any square corner.

Additional variations and modifications within the scope of the present invention will be apparent to persons of skill in the art, such modifications are encompassed in the appended claims.

I claim:

1. An apparatus for injecting sealant material into a corner of a glass assembly including at least two substrates having corners aligned in spaced apart configuration by a spacer joining the peripheries of the substrates, comprising:

support means for supporting the glass assembly in the apparatus;

positioning means for locating the corner of a glass assembly in the apparatus;

securing means for maintaining the glass assembly in position in the apparatus;

a cooperating pair of wiper blocks each having a surface for abutting an edge of the glass assembly arranged in angular configuration to each other, adapted for converging and diverging reciprocal movement from a first adjoining position for molding the injected sealant material into an angled square corner, to a second separated position for wiping smooth the surface of the injected sealant material; and nozzle means for injecting sealant material into a corner of a glass assembly arranged between the wiper blocks and adapted to retract from the corner of the glass assembly in concert with the converging movement of the wiper blocks.

2. An apparatus for injecting sealant material into a corner of a glass assembly as defined in claim 1, wherein the apparatus includes means for repositioning itself relative to the glass assembly.

3. An apparatus for injecting sealant material into a corner of a glass assembly as defined in claim 2, wherein means for repositioning comprises manual means for rotation of the glass assembly.

4. An apparatus for injecting sealant material into a corner of a glass assembly as defined in claim 1, wherein the angular configuration of the wiper blocks comprises a 90° angle for molding a substantially square corner.

5. An apparatus for injecting sealant material into a corner of a glass assembly as defined in claim 1, wherein each of the wiper blocks has a non-stick surface for contacting the injected sealant material.

6. An apparatus for injecting sealant material into a corner of a glass assembly as defined in claim 5, wherein each of the wiper blocks has a heated surface for contacting the injected sealant material.

7. An apparatus for injecting sealant material into a corner of a glass assembly as defined in claim 1, wherein each of the wiper blocks has a profile to fill a channel between substrates and spacer material in an edge of the glass assembly.

8. An apparatus for injecting sealant material into a corner of a glass assembly as defined in claim 1, wherein the nozzle has side surfaces to abut an end of each wiper block.

9. An apparatus for injecting sealant material into a corner of a glass assembly as defined in claim 1, wherein the nozzle is heated.

10. An apparatus for injecting sealant material into a corner of a glass assembly as defined in claim 9, wherein the nozzle is provided with additional heating means for heating adjacent spacer material and substrates.

11. An automated sealant injection station for sealing the corners of a glass assembly comprising:

conveyor means for advancing a glass assembly into and out of the injection station;

at least one injection head comprising:

positioning means for locating the corner of a glass assembly in the apparatus;

securing means for maintaining the glass assembly in position in the apparatus;

a cooperating pair of wiper blocks each having a surface for abutting an edge of the glass assembly arranged in angular configuration to each other, adapted for converging and diverging reciprocal movement from a first adjoining position for molding the injected sealant material into an angled corner, to a second separated position for wiping smooth the surface of the injected sealant material; and nozzle means for injecting sealant material into a corner of a glass assembly arranged between the wiper blocks and adapted to retract from the corner of the glass assembly in concert with the converging movement of the wiper blocks, wherein each injection head is adapted to receive a corner of an assembly for sealing, and to retract to allow the assembly to pass through the station once the sealing operation is complete.

12. An automated sealant injection station for sealing the corners of a glass assembly as defined in claim 11, including two cooperating injection heads each injection head including means for rotatable positioning from a first position for receiving two leading corners of the assembly to a second position for receiving two trailing corners of the assembly.

13. Automated sealant injection station for sealing the corners of a glass assembly as defined in claim 11, wherein at least one of the injection heads is moveable to adapt the sealant injection station to the size of the glass assembly.

14. Automated sealant injection station for sealing the corners of a glass assembly as defined in claim 11, wherein a number of stations each including two cooperating injection heads are arranged sequentially with respect to the conveyor means for sealing corners of a number of assemblies simultaneously.

15. Automated sealant injection station for sealing the corners of a glass assembly as defined in claim 14, wherein at least one of the cooperating injection heads in each station is moveable to adapt the sealant injection station to the size of the glass assembly.

16. Automated sealant injection station for sealing the corners of a glass assembly as defined in claim 11, wherein a corner of a glass assembly comprises a joint or bend of the spacer in an irregular shaped assembly.

* * * * *